United States Patent
Ji

(10) Patent No.: US 10,645,377 B2
(45) Date of Patent: May 5, 2020

(54) THREE-DIMENSIONAL DISPLAY SYSTEM

(71) Applicant: BOE TECHNOLOGY GROUP CO., LTD., Beijing (CN)

(72) Inventor: Chunyan Ji, Beijing (CN)

(73) Assignee: BOE TECHNOLOGY GROUP CO., LTD., Beijing (CN)

(*) Notice: Subject to any disclaimer, the term of this patent is extended or adjusted under 35 U.S.C. 154(b) by 180 days.

(21) Appl. No.: 15/861,296

(22) Filed: Jan. 3, 2018

(65) Prior Publication Data
US 2018/0192043 A1    Jul. 5, 2018

(30) Foreign Application Priority Data
Jan. 3, 2017  (CN) .......................... 2017 1 0001711

(51) Int. Cl.
*H04N 13/30*     (2018.01)
*H04N 13/395*    (2018.01)
(Continued)

(52) U.S. Cl.
CPC ........... *H04N 13/395* (2018.05); *G02B 30/25* (2020.01); *G02B 30/52* (2020.01); *H04N 13/117* (2018.05);
(Continued)

(58) Field of Classification Search
CPC ........... H04N 13/0495; H04N 13/0497; H04N 13/0409; H04N 13/0404; H04N 13/0285;
(Continued)

(56) References Cited

U.S. PATENT DOCUMENTS 6,302,542 B1 * 10/2001 Tsao ....................... G03B 21/28
                                                                353/7
9,046,758 B2 *  6/2015 Liu ....................... G02B 5/0252
(Continued)

FOREIGN PATENT DOCUMENTS

CN        1652614 A    8/2005
CN       101630066 A   1/2010
(Continued)

OTHER PUBLICATIONS

First Office Action for Chinese Application No. 201710001711.4, dated Sep. 17, 2018, 8 Pages.

*Primary Examiner* — Shawn S An
(74) *Attorney, Agent, or Firm* — Brooks Kushman P.C.

(57) ABSTRACT

A three-dimensional display system is provided. The three-dimensional display system includes: a projection body having a three-dimensional shape and a transflective property; an optical reflector including at least one reflection surface; a first driving structure for driving the projection body or the optical reflector to rotate, so that the projection body and the optical reflector rotate relative to each other; an image processor for decomposing a three-dimensional image of an object to obtain multiple two-dimensional images at different cross-sections of the three-dimensional image, and sending the two-dimensional images to at least one projector configured to project the two-dimensional images onto one of the at least one reflection surface in sequence at a regular interval, and reflect the two-dimensional images to different positions on the projection body by means of the at least one reflection surface, to form the three-dimensional image.

17 Claims, 4 Drawing Sheets

(51) Int. Cl.
*H04N 13/117* (2018.01)
*H04N 13/189* (2018.01)
*H04N 13/194* (2018.01)
*H04N 13/261* (2018.01)
*H04N 13/286* (2018.01)
*H04N 13/305* (2018.01)
*H04N 13/31* (2018.01)
*H04N 13/398* (2018.01)
*H04N 13/393* (2018.01)
*G02B 30/25* (2020.01)
*G02B 30/52* (2020.01)

(52) U.S. Cl.
CPC ......... *H04N 13/189* (2018.05); *H04N 13/194* (2018.05); *H04N 13/261* (2018.05); *H04N 13/286* (2018.05); *H04N 13/305* (2018.05); *H04N 13/31* (2018.05); *H04N 13/393* (2018.05); *H04N 13/398* (2018.05)

(58) Field of Classification Search
CPC ............. H04N 13/026; H04N 13/0059; H04N 13/0055; H04N 13/0014; G02B 27/26; G02B 27/2278
See application file for complete search history.

(56) References Cited

U.S. PATENT DOCUMENTS

| | | | | |
|---|---|---|---|---|
| 2008/0266523 | A1* | 10/2008 | Otsuka | G02B 27/2285 353/7 |
| 2011/0102745 | A1* | 5/2011 | Cheng | G03B 21/28 353/10 |
| 2013/0201455 | A1* | 8/2013 | Endo | G02B 27/22 353/7 |
| 2015/0042653 | A1* | 2/2015 | Takaki | G03B 35/20 345/426 |

FOREIGN PATENT DOCUMENTS

| | | | | |
|---|---|---|---|---|
| CN | 101881922 A | 11/2010 | | |
| CN | 103631080 A | 3/2014 | | |
| JP | 02005221690 A | * | 8/2005 | ............. G09F 19/14 |

\* cited by examiner

THREE-DIMENSIONAL DISPLAY SYSTEM

CROSS-REFERENCE TO RELATED APPLICATION

This application claims priority to Chinese Patent Application No. 201710001711.4 filed Jan. 3, 2017, which is incorporated herein by reference in its entirety.

TECHNICAL FIELD

The present disclosure relates to a field of a three-dimensional display technique, and particularly relates to a three-dimensional display system.

BACKGROUND

Because a three-dimensional display (3D) technique may reproduce the real and objective world and has a wide development prospect, a study of the three-dimensional display technique has been attracting attention increasingly. One kind of the three-dimensional display technique is called a volumetric three-dimensional display technique, which has more advantages over a 3D holographic projection display technique in terms of technical implementation and technical results and may reproduce depth, hierarchy and reality senses of an image with a 360-degree perspective.

An ordinary volumetric three-dimensional display technique is generally used for shopwindow relevation. The volumetric three-dimensional display system generally includes a rectangular pyramid formed of four special spectroscopes arranged at four side-surfaces of the rectangular pyramid. The spectroscope on each side-surface faces a display device which outputs corresponding image information of an object to be displayed. The corresponding image information is transmitted to the spectroscope. Lights on each side-surface may be reflected back and into human eyes by the spectroscope on the side-surface. A suspended three-dimensional display of the object may be formed after the image information. The above-mentioned display device usually may be a projector configured to project the image information onto the spectroscope corresponding to the display device.

However, the display device corresponding to the spectroscope needs to be arranged at the spectroscope in the above three-dimensional display system, and in case that all details of the displayed object need to be presented with a 360-degree perspective and from every angle of the 360 degrees, the image information needs to be split into more signals and the number of the display devices needs be increased accordingly.

SUMMARY

In one aspect, a three-dimensional display system is provided in the present application. The three-dimensional display system includes: a projection body having a three-dimensional shape and a transflective property; an optical reflector including at least one reflection surface; a first driving structure configured to drive one of the projection body and the optical reflector to rotate, so that the projection body and the optical reflector rotates relative to each other; at least one projector; an image processor configured to decompose a three-dimensional image of an object to be displayed to obtain a plurality of two-dimensional images at different cross-sections of the three-dimensional image, and to send the plurality of two-dimensional images to the at least one projector; wherein the at least one projector is configured to project the plurality of two-dimensional images onto one of the at least one reflection surface in sequence at a regular interval, and the at least one reflection surface is configured to reflect the plurality of two-dimensional images to different positions on the projection body to form the three-dimensional image.

Optionally, the optical reflector is a platform, the at least one reflection surface comprises one reflection surface, and one horizontal surface of an upper horizontal surface and a lower horizontal surface of the platform facing towards the projection body is the reflection surface; and the projection body is separated from the reflection surface and fixedly arranged above the reflection surface, the first driving structure is arranged below the optical reflector and configured to drive the optical reflector to rotate, so that the projection body and the optical reflector rotate relative to each other.

Optionally, the at least projector is separated from the reflection surface and fixedly arranged above the reflection surface, and the projector is formed to have a polyhedral pyramid shape or a hemispherical shape.

Optionally, the at least one reflection surface comprises at least two reflection surfaces, the at least two reflection surfaces face towards different directions, the projection body is arranged rotatably above the at least two reflection surfaces, the first driving structure is configured to drive the projection body to rotate, so that the projection body and the optical reflector rotate relative to each other.

Optionally, the at least one projector is fixedly arranged on a carrying platform; the projection body, the at least two reflection surfaces, the first driving structure and the at least one projector are arranged above the carrying platform, and the projection body is formed to have a polyhedral pyramid shape or a hemispherical shape.

Optionally, in case that the projection body is formed to have the polyhedral pyramid shape, an inclination angle of each surface of the polyhedral pyramid shape relative to the reflection surface is between 40 degrees and 50 degrees; in case that the projection body is formed to have the hemispherical shape, an inclination angle of a corresponding tangent plane relative to the reflection surface is between 40 degrees and 50 degrees at each position on the projection body, a vertical distance between which and the reflection surface is a half of a height of the projection body.

Optionally, the at least two reflection surfaces are fixedly arranged, the first driving structure is configured to drive the projection body to rotate, so that the projection body and the at least two reflection surfaces rotate relative to each other.

Optionally, the three-dimensional display system further includes: a second driving structure, arranged below the carrying platform and configured to drive the carrying platform to rotate, wherein in case that the second driving structure drives the carrying platform to rotate, the at least one projector rotates relative to the at least two reflection surfaces, and the plurality of two-dimensional images are projected onto one of the at least two reflection surfaces in sequence each time the at least one projector rotates by an angle, the projected plurality of two-dimensional images are reflected by each of the at least two reflection surfaces onto the projection body that rotates, and the three-dimensional image is formed.

Optionally, the at least one projector includes two projectors arranged opposite to each other, and the two projectors are radially symmetrical to each other relative to a center of the at least one reflection surface.

Optionally, in case that the three-dimensional image is decomposed by the image processor, a number of the plurality of two-dimensional images that are obtained is at least 150.

Optionally, the at least one projector comprises one projector, and when the plurality of two-dimensional images are projected onto one of the at least one reflection surface in sequence at the regular interval, the projection body rotates by an angle between 0.5 degree and 2 degrees within the interval relative to the at least one reflection surface.

Optionally, the image processor is connected with the at least one projector and the first driving structure in a wired or wireless way, or the image processor and the at least one projector are integrated and connected with the first driving structure in a wired or wireless way.

Optionally, the projection body is made of a transflective material.

Optionally, the reflection surface includes a diffuse planar medium.

Optionally, the projection body rotates by an angle between 1 degree and 4 degrees within the interval when the plurality of two-dimensional images are projected to one of the at least one reflection surface in sequence at the regular interval.

Optionally, the at least one projector is fixedly arranged on the projection body or fixedly arranged on a carrying device separated from the optical reflector.

Optionally, the at least two reflection surfaces are fixedly arranged, a top of the projection body having the polyhedral pyramid shape or the hemispherical shape is farther away from the optical reflector than a bottom of the projection body.

Optionally, a bottom of the projection body having the polyhedral pyramid shape or the hemispherical shape is farther away from the optical reflector than to top of the projection body.

Optionally, the at least one projector is fixedly arranged on the reflection surface and rotates with the reflection surface simultaneously, and the projection body is formed to have a polyhedral pyramid shape or a hemispherical shape.

Optionally, a control signal is outputted to the first driving structure by the image processor at the regular interval to cause the at least projector to project one of the plurality of two-dimensional images onto the at least one reflection surface.

DETAILED DESCRIPTION

In order to make technical problems to be solved, technical solutions and advantages of the present disclosure more clear, embodiments of the present disclosure will be described in detail hereinafter in conjunction with the drawings.

The embodiments of the present disclosure provide a three-dimensional display system, and the three-dimensional display system includes: a projection body having a three-dimensional shape and a transflective property; an optical reflector including at least one reflection surface; a first driving structure configured to drive one of the projection body and the optical reflector to rotate, so that the projection body and the optical reflector rotate relative to each other; at least one projector; an image processor configured to decompose a three-dimensional image of an object to be displayed to obtain a plurality of two-dimensional images at different cross-sections of the three-dimensional image, and configured to send the plurality of two-dimensional images to the at least one projector. The at least one projector is configured to project the plurality of two-dimensional images onto one of the at least one reflection surface in sequence at a regular interval, and to reflect different ones of the plurality of two-dimensional images to different positions on the projection body by means of the at least one reflection surface to form a three-dimensional virtual image.

By arranging the optical reflector including the at least one reflection surface and enabling a relative rotation speed to exist between the projection body and the optical reflector in the three-dimensional display system provided by the embodiments of the present disclosure, when the relative rotation speed reaches a certain value and the at least one projector is operated within one refresh period and the plurality of two-dimensional images of the three-dimensional image are projected onto the projection body by the at least one reflection surface in a time-shared manner, the three-dimensional virtual image having a stereoscopic shape may be presented on the projection body.

Figure 1:
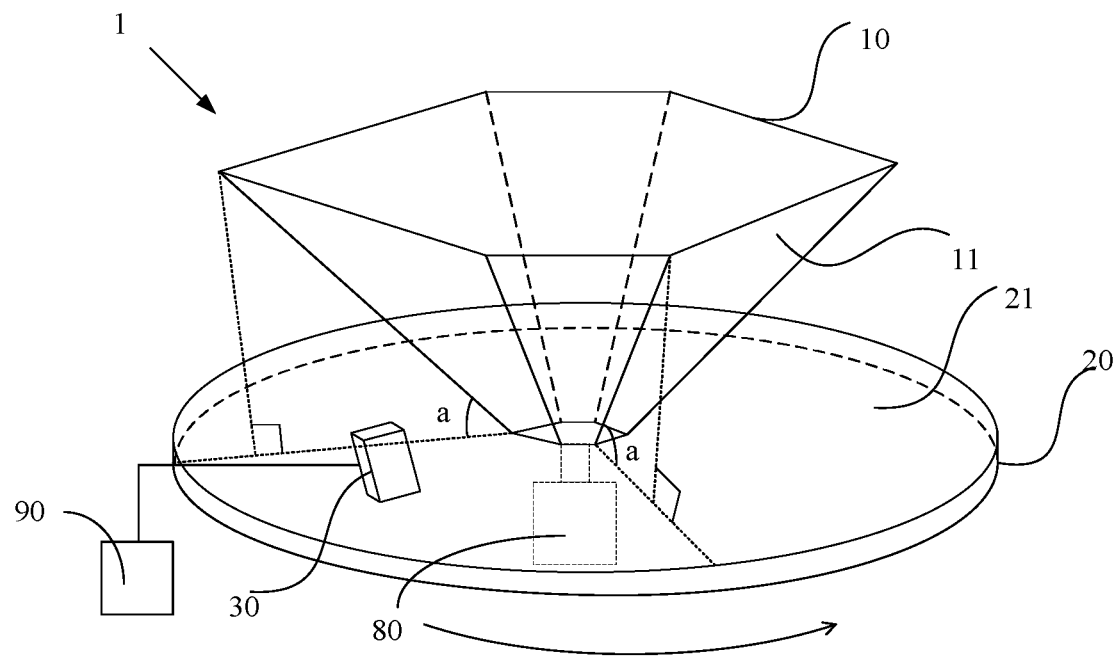
FIG. 1 shows a schematic diagram of an example of a volumetric structure of a three-dimensional display device provided by embodiments of the present disclosure.

FIG. 1 is a schematic diagram of an example of a three-dimensional structure of the three-dimensional display system 1 provided by the embodiments of the present disclosure. Referring to FIG. 1, the three-dimensional display system 1 includes a projection body 10, an optical reflector 20, a projector 30, a first driving structure 80 and an image processor 90.

As shown in FIG. 1, the projection body 10 in the embodiments of the present disclosure is a pyramidal structure having a plurality of projection surfaces 11 and made of a transflective material such as glass, plastic, or the like. The optical reflector 20 is formed as a platform. One horizontal surface of upper and lower horizontal surfaces of the platform facing towards the projection body 10 is a reflection surface 21. The reflection surface 21 may be formed by attaching a diffuse planar medium onto the horizontal surface of the platform body facing towards the projection body 10. The projection body 10 may be separated from the reflection surface 21 and is fixedly arranged above the reflection surface 21. The first driving structure 80 may be configured to drive the whole of the optical reflector 20 to rotate at a high speed so that the projection body 10 and the reflection surface 21 may rotate relative to each other.

Specifically, the first driving structure 80 may be installed below the optical reflector 20 as shown in FIG. 1, so as to drive the optical reflector 20 to rotate at a high speed in one direction. The first driving structure 80 may include a driving motor configured to drive the optical reflector 20 to rotate at the high speed.

The image processor 90 may be configured to decompose a three-dimensional image of an object to be displayed to obtain a plurality of two-dimensional images at different cross-sections of the three-dimensional image. Specifically, the number of two-dimensional images that are sectioned may be 200 or more. A specific way of obtaining the two-dimensional images at different cross-sections of the three-dimensional image may be known for one of ordinary skills in the art and will not be described in the present disclosure. The projector 30 may be connected with the image processor 90 by wires, such as data lines, or in a wireless way. The projector 30 and the image processor 90 may also be arranged integrally. The two-dimensional images obtained by decomposing the three-dimensional image may be sent by the image processor 90 to the projector 30. The projector 30 may be configured to project the two-dimensional images onto the reflection surface 21 in sequence at a regular interval. Different ones of the two-dimensional images may be projected onto different positions of the projection body 10 through the reflection surface 21 to form the three-dimensional virtual image. In the embodiments of the present disclosure, the projector 30 may be arranged to be independent from the optical reflector 20, and the optical reflector 20 may rotate at a high speed, and the projector 30 may be fixedly arranged, for example be fixedly arranged on the projection body 10 or fixedly arranged on a carrying device separated from the optical reflector 20. One two-dimensional image may be projected onto a position on the reflection surface 21 by the projector 30 each time the optical reflector 20 rotates by an angle.

Specifically, because the optical reflector 20 formed as the platform may rotate relative to the projection body 10 at a high speed, one two-dimensional image may be projected by the projector 30 each time the optical reflector 20 rotates by an angle relative to the projection body 10 in a specific direction. Since the reflection surface 21 of the optical reflector 20 rotates relative to the projection body 10 between two adjacent ones of the two-dimensional images outputted by the projector 30, the two adjacent two-dimensional images reach different positions on the projection body 10 after being reflected by the reflection surface 21. A three-dimensional (3D) object that may be observed from every direction may be presented on the projection body 10 when the reflection surface 21 rotates relative to the projection body 10 at a high speed and the two-dimensional images are projected onto different positions of the projection body 10 in sequence.

Optionally, when the optical reflector 20 rotates relative to the projection body 10, one two-dimensional image may be projected by the projector 30 each time the optical reflector 20 rotated by an angle less than 2 degrees. That is, each time the reflection surface 21 rotates by an angle between 0.5 degree and 2 degrees relative to the projection body 10, one two-dimensional image may be projected by the projector 30. Therefore, in case that 200 or more two-dimensional images need be outputted within a time period of outputting a three-dimensional image frame, the rotation speed of the optical reflector 20 relative to the projection body 10 should be adapted with an output frequency of the two-dimensional images, so that a satisfactory 3D display effect may be achieved. Specifically, a switching time of two adjacent three-dimensional image frames should be adapted with the time needed for the optical reflector 20 to rotate a round, to achieve the adaptation between the rotation speed of the optical reflector 20 and the output frequency of the two-dimensional images.

Specifically, it may be understood for one of ordinary skills in the art that the projector 30 may include a projection image generation element. For example, for a digital-light-processor (DLP) projector, the projector 30 may include an image processor, a plurality of reflection lens, a projection objective lens, a light source, a trichromatic lens, an analog-digital decoder, a memory-chip, a digital signal processor, an image processor and a digital micro-mirror, and the like. Two-dimensional images outputted from the image processor may be sent to the digital micro-mirror after being processed by the analog-digital decoder, the digital signal processor and the image processor and the like. Light beams emitted from the light source may be projected onto the digital micro-mirror after passing through a trichromatic lens rotating at a high speed, and may be reflected by the digital micro-mirror, and then be projected out through the projection objective lens after being reflected by an optical system including a plurality of reflection lens. The digital micro-mirror may be formed by a plurality of tiny square reflection mirrors (referred to as micro-mirrors) which are closely arranged in rows and attached together on electronic nodes of a silicon wafer. Each micro-mirror may correspond to a pixel of a generated image, and be configured to combine R/G/B three color images having passed through the trichromatic lens into one two-dimensional image. Two-dimensional images projected out by the projector 30 may be projected onto the reflection surface 21 of the optical projector 20, and then projected onto different positions of the projection body 10 by the reflection surface 21.

In the embodiments of the present disclosure, the number of the projector 30 is one. The projector 30 may be optionally controlled based on a micro electro-mechanical system to achieve a higher accuracy and provide sufficiently high frame-frequencies and bandwidths.

On the other hand, in the embodiments of the present disclosure, the projection body 10 is formed as a polyhedral pyramid structure, and an inclination angle α of each pyramidal surface of the pyramid structure relative to the reflection surface 21 is between 40 degrees and 50 degrees. In addition, in the embodiments of the present disclosure, the projection body 10 is not limited to be formed as the polyhedral pyramid structure, and may also be a transflective hemispherical structure. In case that the projection body 10 is formed to be the hemispherical structure, a corresponding tangent plane may be determined at each position on the projection body 10, a vertical distance between which and the reflection surface 21 is a predetermined distance, and an inclination angle α of this tangent plane relative to the reflection surface 21 may be between 40 degrees and 50 degrees.

In the three-dimensional display system of the embodiments of the present disclosure, the projection body 10 and the projector 30 may be fixedly arranged, and the optical reflector 20 may rotate at a high speed. The two-dimensional images outputted from the projector 30 may be projected onto the reflection surface 21 of the optical reflector 20, be reflected onto the transflective projection surfaces 11 of the projection body 10, and a suspended three-dimensional effect may be composed in vision of a user by lights reflected back from the projection surfaces 11. Because a duration of a persistence of vision of human eyes is 50-100 ms, the human eyes may be impressed with a continuous luminous object when a flash frequency of a light source is larger than 10 Hz. Optionally, the larger the rotation speed of the optical reflector 20 is, the smaller the effect of the persistence of vision is.

In the three-dimensional display system, a three-dimensional display on the projection body may be achieved by arranging only one projector 30, without arranging a plurality of image output devices facing towards the spectroscopes respectively. Thus, installation of the three-dimensional display system may be easier and a cost thereof may be greatly reduced.

Figure 2:
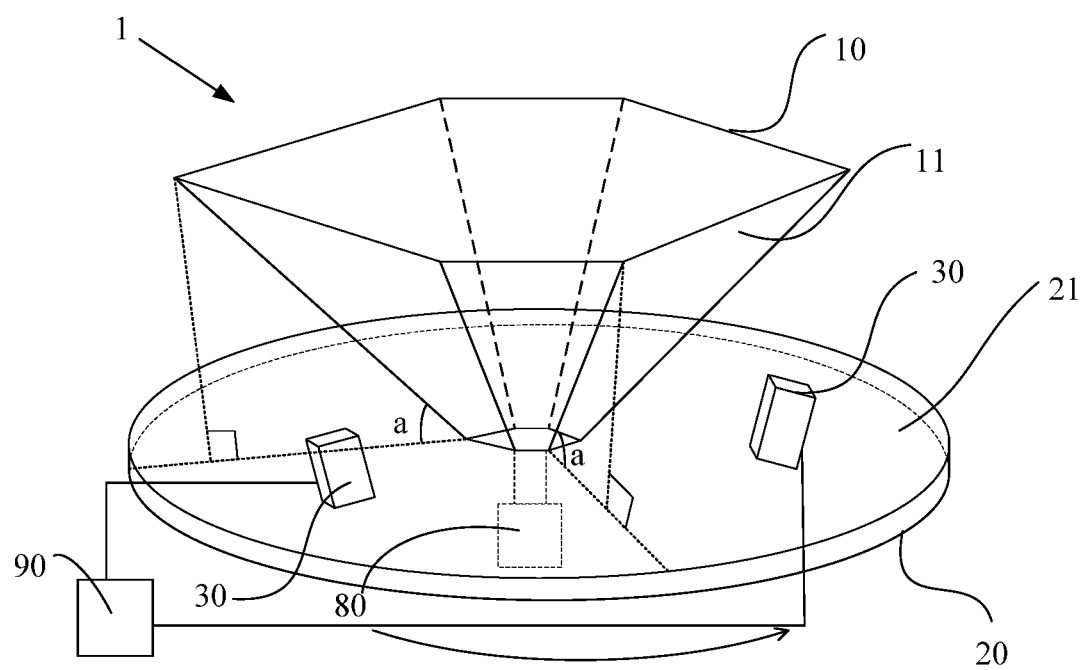
FIG. 2 shows a schematic diagram of an example of a volumetric structure of a three-dimensional display device provided by the embodiments of the present disclosure.
Figure 3:
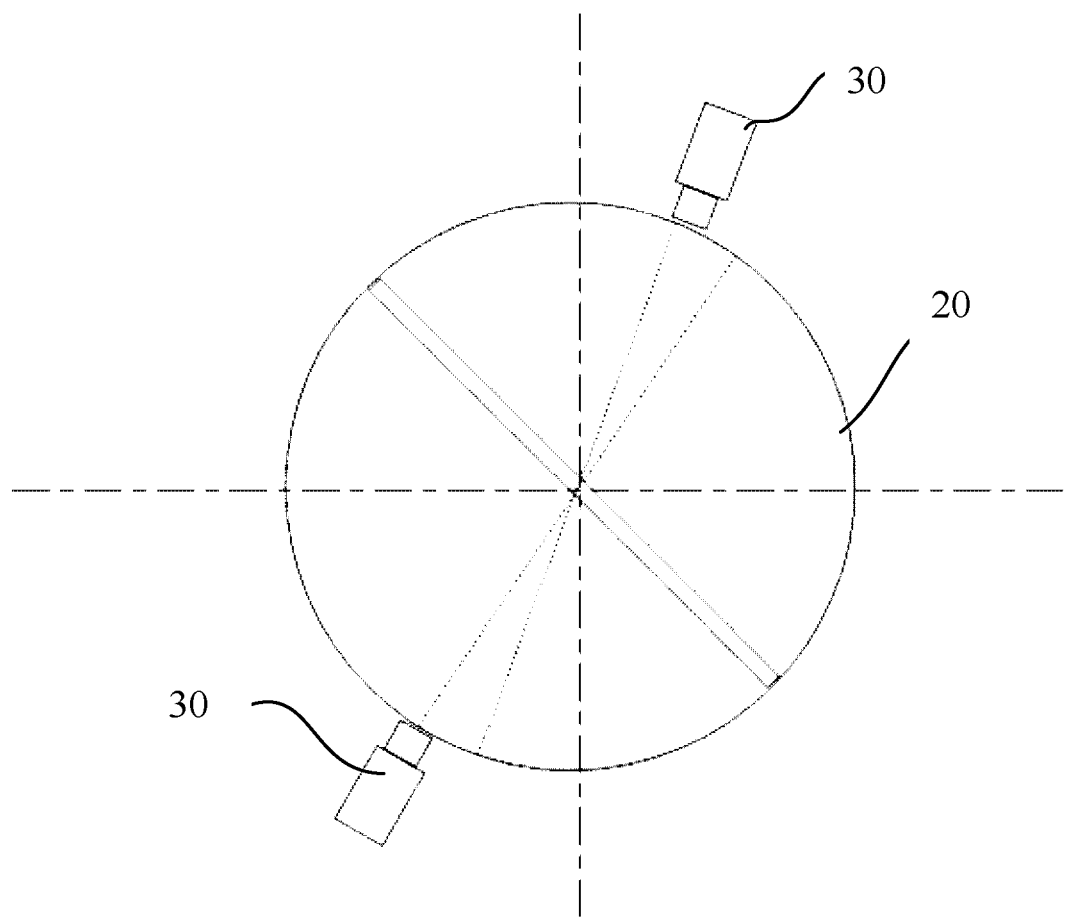
FIG. 3 shows a schematic diagram of installation positions of two projectors in case that two projectors are arranged in the three-dimensional display device provided by the embodiments of the present disclosure.

Optionally, two projectors 30 may be arranged in the embodiments of the present disclosure, and may be arranged to face towards each other at both sides of the projection body 11, respectively. As shown in FIG. 2 and FIG. 3, the two projectors 30 may be radially symmetrical to each other relative to a rotation center of the reflection surface 21. Optionally, the reflection surface 21 may be capable of bidirectional scattering. According to the above-mentioned principle of adaptation between images outputted from the projector 30 and rotation of the optical reflector 20, in case that the two projectors 30 are configured to project images and the optical reflector 20 rotates at a high speed, the three-dimensional display on the projection body 10 may also be achieved by simply causing the two projectors 30 to project two-dimensional images which have an angle difference of 180 degrees relative to a rotation of the optical reflector, respectively, compared with a case in which only one projector 30 is arranged. A principle of achieving the three-dimensional display by arranging the two projectors may be understood by one of ordinary skills in the art based on the principle of achieving the three-dimensional display by arranging one projector 30, and is not described herein in detail.

By arranging the two projectors 30, a refresh period of the three-dimensional image may be finished each time the optical reflector 20 rotates 180 degrees, and a full three-dimensional image may be reproduced on the projection body 10. Therefore, in comparison with the case in which one projector 30 is arranged, the rotation speed of the optical reflector 20 may be reduced by a half by arranging the two projectors 30, and the output frequency of the two-dimensional images of the two projectors 30 may also be reduced by a half, so that the three-dimensional imaging technique may be implemented more easily.

Figure 4:
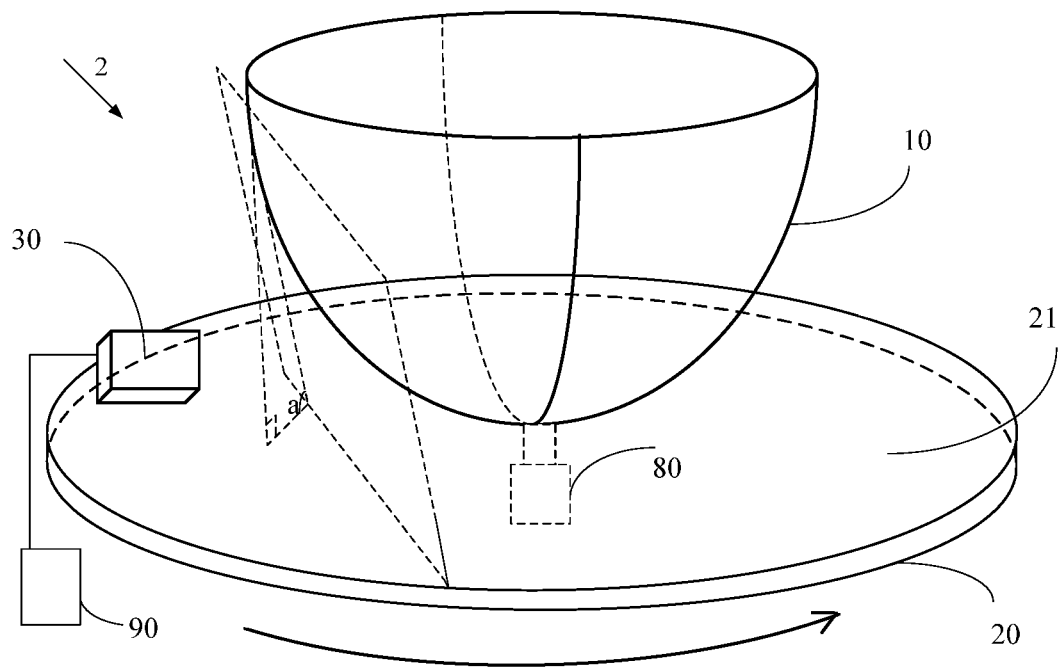
FIG. 4 shows a schematic diagram of an example of a volumetric structure of a three-dimensional display device provided by the embodiments of the present disclosure.

In addition, the embodiments of the present disclosure further provide a three-dimensional display system 2. Referring to FIG. 4, the three-dimensional display system 2 may include a projection body 10, an optical reflector 20, a projector 30, a first driving structure 80 and an image processor 90.

In the three-dimensional display system 2 shown in FIG. 4, the projection body 10 may be formed to be a hemispherical structure and made of a transflective material such as glass, plastic, or the like. A corresponding tangent plane may be determined at each position on the projection body 10, a vertical distance between which and the reflection surface 21 is a predetermined distance, and an inclination angle α of this tangent plane relative to the reflection surface 21 may be between 40 degrees and 50 degrees. The predetermined distance may be a half of a height of the projection body 10. Of course, the projection body 10 may also be formed as the pyramid structure having the plurality of projection surfaces 11 as shown in FIG. 1. The optical projector 20 may be formed as the platform, and the horizontal surface of the upper surface and the lower surface of the platform facing towards the projection body 10 is the reflection surface 21. The projection body 10 may be separated from the optical reflector 20 and arranged above the reflection surface 21 fixedly.

In the embodiment shown in FIG. 4 of the present disclosure, the first driving structure 80 may include a driving motor which is arranged below the other surface of the optical reflector 20 facing away from the projection body 10 and is configured to drive the optical reflector 20 to rotate at high speed, so that the projection body 10 and the reflection surface 21 may rotate relative to each other. Specifically, the first driving structure 80 may be installed below the platform of the optical reflector 20 shown in FIG. 4 to drive the platform to rotate at a high speed in one direction.

In the embodiment shown in FIG. 4 of the present disclosure, the projector 30 may be arranged fixedly on the reflection surface 21 of the optical reflector 20. The projector 30 and the optical reflector 20 may rotate at a high speed simultaneously when being driven by the first driving structure.

The projector 30 may be connected with the image processor 90 by wires, such as data lines, or in a wireless way, or may be arranged integrally with the image processor 90. The image processor 90 may be configured to decompose the three-dimensional image of the object to be displayed, section the three-dimensional image to obtain the plurality of two-dimensional images at different cross-sections of the three-dimensional image. Specifically, the number of the plurality of two-dimensional images may be 200 or more. The projector 30 may be configured to project the two-dimensional images to the reflection surface 21 in sequence at a regular interval after the two-dimensional images obtained by the image processor 90 are sent to the projector 30. The two-dimensional images may be reflected onto different positions on the projection body 10 by the reflection surface 21 to form the three-dimensional virtual image.

In the embodiment shown in FIG. 4 of the present disclosure, although the projector 30 and the optical reflector 20 may rotate at the high speed simultaneously, the reflection surface 21 of the optical reflector 20 may rotate at the high speed relative to the projection body 10 since the projection body 10 is fixedly arranged. One two-dimensional image may be projected by the projector 30 each time the reflection surface 21 rotates by an angle in one direction relative to the projection body 10. Although positions of the two-dimensional images projected by the projector 30 on the reflection surface 21 are fixedly arranged, two adjacent two-dimensional images may are outputted to different positions on the projection body 10 after being reflected by the reflection surface 21, since the reflection surface 21 may rotate relative to the projection body 10 at the high speed. The suspended three-dimensional effect may be composed in vision of the user by lights reflected back from the projection surface 11 of the projection body 10, and a 3D object that may be seen omnidirectionally may be presented on the projection body 10.

Optionally, one two-dimensional image may be projected by the projector 30 each time the reflection surface 21 rotates by an angle between 0.5 degree and 2 degrees relative to the projection body 10, and more than 150 two-dimensional images need to be projected by the projector 30 within the output time of a three-dimensional image frame. Optionally, 200 two-dimensional images need to be projected within the output time of a three-dimensional image frame. Therefore, the rotation speed of the reflection surface 21 relative to the projection body 10 should be adapted with the output frequency of the two-dimensional images.

Specifically, the principle of adaptation between the rotation speed of the reflection surface 21 relative to the projection body 10 and the output frequency of the two-dimensional images may be similar to that of the embodiment shown in FIG. 1. A structure and an operation principle of the projector 30 may be also similar to those in the embodiment shown in FIG. 1, and will not be described further herein.

Figure 5:
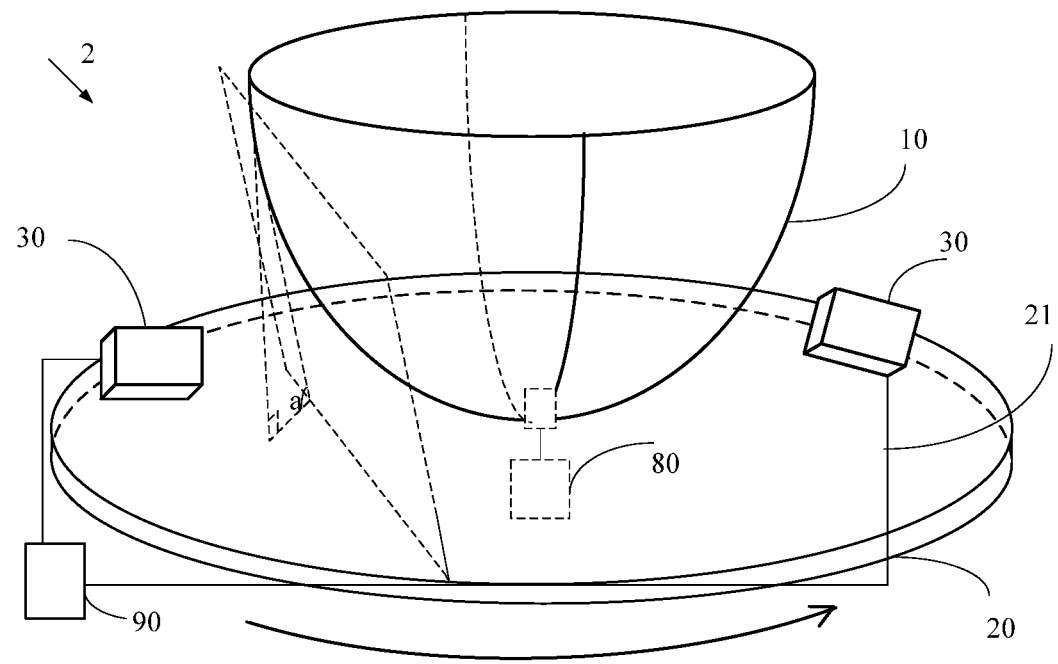
FIG. 5 shows a schematic diagram of an example of a volumetric structure of a three-dimensional display device provided by the embodiments of the present disclosure.

In addition, as shown in FIG. 5, two projectors 30 may also be arranged in the three-dimensional display system 2. Referring to FIG. 3 and FIG. 5, the two projectors 30 may be fixedly arranged and be opposite to each other on the reflection surface 21, and may rotate simultaneously with the optical reflector 20 at a high speed. Relationship between two-dimensional images projected by the two projectors 30 is similar to that in the embodiment shown in FIG. 2 in case that the two projectors 30 are arranged, and will not be described further herein. Similarly, in case that the two projectors 30 are arranged, the refresh period of the three-dimensional image may be finished each time the optical reflector 20 and the projectors 30 rotate simultaneously 180 degrees, and a complete three-dimensional image may be reproduced by the projection body 10. In case that the two projectors 30 are arranged, in comparison with the case of arranging one projector 30 only, the rotation speed of the optical reflector 20 may be reduced by a half, and the output frequency of the two-dimensional images of the projectors 30 may be reduced by a half as well, so that it is easier to display the three-dimensional image.

In the embodiment shown in FIG. 4 of the present disclosure, the three-dimensional display may also be achieved on the projection body 10 by fixing the projector 30 on the optical reflector 20 which rotates at a high speed, and causing the projector 30 and the optical reflector 20 to rotate relative to the projection body 10 at a high speed.

Figure 6:
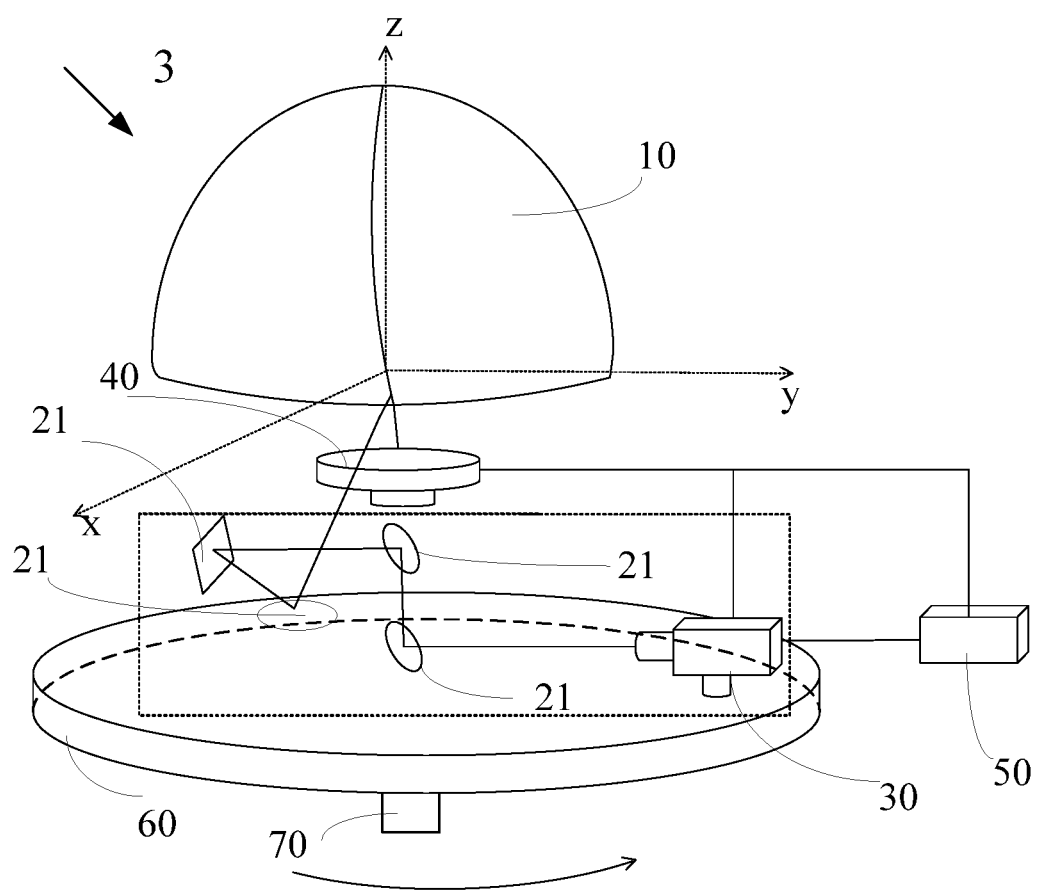
FIG. 6 shows a schematic diagram of an example of a volumetric structure of a three-dimensional display device provided by the embodiments of the present disclosure.

In addition, the embodiments of the present disclosure further provide a three-dimensional display system 3. As shown in FIG. 6, the three-dimensional display system 3 may include a projection body 10, an optical reflector 20, a projector 30, a first driving structure 40, an image processor 50 and a carrying platform 60.

The projection body 10 may be formed to have a hemispherical structure, and made of a transflective material such as glass, plastic or the like. A corresponding tangent plane may be determined at each position on the projection body 10, a vertical distance between which and the reflection surface 21 of the optical reflector 20 is a half of the height of the projection body 10, and an inclination angle α of this tangent plane relative to the reflection surface 21 of the optical reflector 20 may be between 40 degrees and 50 degrees. Certainly, the projection body 10 may also be formed as a pyramid structure having a plurality of projection surfaces 11 as shown in FIG. 1.

As shown in FIG. 6, a plurality of reflection surfaces 21 facing towards different directions may be arranged on the optical reflector 20. The projection body 10 may be fixedly arranged above these reflection surfaces 21. In the embodiment shown in FIG. 6, the reflection surfaces 21 of the optical reflector 20 are fixedly arranged.

In the embodiment shown in FIG. 6, the first driving structure 40 may be configured to drive the projection body 10 to rotate at high speed. The first driving structure 40 may include a driving motor. The driving motor may be arranged below or above the projection body 10, and configured to drive the projection body 10 to rotate relative to the reflection surfaces 21 at the high speed.

The carrying platform 60 may be configured to carry the projector 30 fixedly. Optionally, the carrying platform 60 may be fixedly arranged.

In addition, the projector 30 may be connected with the first driving structure 40 and the image processor 50 by wires, such as data lines, or in a wireless way. The image processor 50 may be configured to decompose the three-dimensional image of the object to be displayed, to obtain a plurality of two-dimensional images at different cross-sections of the three-dimensional image, and to output control signals to the first driving structure 40, so that when one two-dimensional image is projected by the projector 30 to the reflection surface 21 at a regular interval, the first driving structure may output a driving signal for causing the projection body 10 to rotate by a specific angle relative to the reflection surface 21.

Optionally, when the projection body 10 rotates relative to the reflection surface 21 at the high speed, one two-dimensional image may be projected by the projector 30 each time the projection body 10 rotates by an angle less than 2 degrees. That is, one two-dimensional image may be projected by the projector 30 each time the reflection surface 21 rotates by an angle between 0.5 degree and 2 degrees relative to the projection body 10. When at least 200 two-dimensional images need to be projected in a duration of outputting a three-dimensional image frame, a rotation speed of the projection body 10 relative to the reflection surfaces 21 should be adapted to the output frequency of the two-dimensional images, to achieve an optimal 3D display effect. Specifically, the three-dimensional display effect may be achieved by a relative rotation of the projection body 10 relative to the reflection surfaces 21. In comparison with a case in which the three-dimensional display effect is achieved by the relative rotation of the reflection surface 21 relative to the projection body 10 in the embodiment shown in FIG. 1, the principles thereof are the same and the principle of adaptation between the rotation speed of the projection body 10 relative to the reflection surface 21 and an output frequency of the two-dimensional images is similar to that in the embodiment shown in FIG. 1, and a structure and an operation principle of the projector 30 may be also similar to those of the embodiment shown in FIG. 1 and will not be described further herein.

In another aspect of the embodiments of the present disclosure, the three-dimensional display system 3 may further include a second driving structure 70. The second driving structure 70 may be arranged on the other surface of the carrying platform 60 facing away from the projection body 10, and configured to drive the carrying platform 60 to rotate. Since the carrying platform 60 is driven to rotate by the second driving structure 70 and the projector 30 is fixedly arranged on the carrying platform 60, the projector 30 may rotate relative to the plurality of reflection surfaces 21, and one two-dimensional image may be projected onto one of the reflection surfaces by the projector 30 each time the projector 30 rotates by a specific angle. The projected two-dimensional images, after being reflected by each reflection surface, may be reflected to the projection body 10 which is rotating at the high speed, and thus the three-dimensional image is formed.

In the embodiment, the projector 30 may be fixedly arranged on the carrying platform 60 and rotate. Since the projector 30 and the projection body 10 rotate simultaneously, each two-dimensional image projected by the projector 30, after being reflected by each reflection surface 21, may be reflected to the projection body 10 which is rotating at the high speed, to form the three-dimensional image. The embodiments shown in FIG. 1 and FIG. 4 may be referred to for details of the principle and the principle is not described again herein.

In addition, in another aspect of the embodiments of the present disclosure, two projectors 30 may also be arranged opposite to each other. Referring to FIG. 3 and FIG. 6, by arranging two projectors 30, the rotation speed of the optical reflector 20 may be reduced by a half, and the output frequency of the two-dimensional images of the projectors 30 may be reduced by a half as well, so that it is easier to display the three-dimensional image. Therefore, in case that the two projectors 30 are arranged, one two-dimensional image may be projected by each projector 30 each time the optical reflector 20 rotates by an angle between 1 degree and 4 degrees relative to the projection body 10.

In the three-dimensional display system 3 provided by the embodiment shown in FIG. 6, the three-dimensional display on the projection body may also be achieved by taking the projector 30 as a display output device of the two-dimensional images and arranging the plurality of reflection surfaces that are fixedly arranged and the projection body that may rotate at high speed and by using a high speed rotation of the projection body relative to the reflection surfaces. Since the plurality of image output devices facing towards spectroscopes respectively are not needed, the installation may be easier and the cost may be greatly reduced.

In the three-dimensional display system provided by the embodiments of the present disclosure, the three-dimensional display on the projection body may be achieved by taking the projector as the output device of the two-dimensional images, using the high speed rotation of the projection body relative to the reflection surfaces, and causing the plurality of two-dimensional images projected by the projector to be projected on different positions of the projection body in the time-shared manner. In comparison with the relevant technique in which a plurality of display devices used for outputting images need to correspond to the spectroscopes respectively and different images are outputted by the display device and form the three-dimensional image on a three-dimensional pyramid, the number of devices used for outputting images may be greatly reduced by using the three-dimensional display system of the embodiments of the present disclosure, so that the installation of the three-dimensional display system may be easier and the cost may be greatly reduced.

The above descriptions are optional embodiments of the present disclosure. It should be noted that numerous modifications and embellishments may be made by one skilled in the art without departing the spirit of the present disclosure. Such modifications and embellishments should also be considered to be within the protection scope of the present disclosure.

What is claimed is:

1. A three-dimensional display system, comprising:
   a projection body having a three-dimensional shape and a transflective property;
   an optical reflector comprising at least one reflection surface;
   a first driving structure configured to drive one of the projection body and the optical reflector to rotate, so that the projection body and the optical reflector rotate relative to each other;
   at least one projector;
   an image processor configured to decompose a three-dimensional image of an object to be displayed to obtain a plurality of two-dimensional images at different cross-sections of the three-dimensional image, and to send the plurality of two-dimensional images to the at least one projector;
   wherein the at least one projector is configured to project the plurality of two-dimensional images onto one of the at least one reflection surface in sequence at a regular interval, and the at least one reflection surface is configured to reflect the plurality of two-dimensional images to different positions on the projection body to form the three-dimensional image,
   wherein the optical reflector is a platform, the at least one reflection surface comprises one reflection surface, and one horizontal surface of an upper horizontal surface and a lower horizontal surface of the platform facing towards the projection body is the reflection surface; and the projection body is separated from the reflection surface and fixedly arranged above the reflection surface, the first driving structure is arranged below the optical reflector and configured to drive the optical reflector to rotate, so that the projection body and the optical reflector rotate relative to each other,
   wherein the at least projector is separated from the reflection surface and fixedly arranged above the reflection surface, and the projector is formed to have a polyhedral pyramid shape or a hemispherical shape,
   wherein in case that the projection body is formed to have the polyhedral pyramid shape, an inclination angle of each surface of the polyhedral pyramid shape relative to the reflection surface is between 40 degrees and 50 degrees;
   in case that the projection body is formed to have the hemispherical shape, an inclination angle of a corresponding tangent plane relative to the reflection surface is between 40 degrees and 50 degrees at each position on the projection body, a vertical distance between which and the reflection surface is a half of a height of the projection body.

2. The three-dimensional display system according to claim 1, wherein the at least one reflection surface comprises at least two reflection surfaces, the at least two reflection surfaces face towards different directions, the projection body is arranged rotatably above the at least two reflection surfaces, the first driving structure is configured to drive the projection body to rotate, so that the projection body and the optical reflector rotate relative to each other.

3. The three-dimensional display system according to claim 2, wherein the at least one projector is fixedly arranged on a carrying platform;
   the projection body, the at least two reflection surfaces, the first driving structure and the at least one projector are arranged above the carrying platform, and the projection body is formed to have a polyhedral pyramid shape or a hemispherical shape.

4. The three-dimensional display system according to claim 3, further comprising:
   a second driving structure, arranged below the carrying platform and configured to drive the carrying platform to rotate,
   wherein in case that the second driving structure drives the carrying platform to rotate, the at least one projector rotates relative to the at least two reflection surfaces, and the plurality of two-dimensional images are projected onto one of the at least two reflection surfaces in sequence each time the at least one projector rotates by an angle, the projected plurality of two-dimensional images are reflected by each of the at least two reflection surfaces onto the projection body that rotates, and the three-dimensional image is formed.

5. The three-dimensional display system according to claim 3, wherein the at least two reflection surfaces are fixedly arranged, a top of the projection body having the polyhedral pyramid shape or the hemispherical shape is farther away from the optical reflector than a bottom of the projection body.

6. The three-dimensional display system according to claim 2, wherein the at least two reflection surfaces are fixedly arranged, the first driving structure is configured to drive the projection body to rotate, so that the projection body and the at least two reflection surfaces rotate relative to each other.

7. The three-dimensional display system according to claim 1, wherein the at least one projector comprises two projectors arranged opposite to each other, and the two projectors are radially symmetrical to each other relative to a center of the at least one reflection surface.

8. The three-dimensional display system according to claim 1, wherein in case that the three-dimensional image is decomposed by the image processor, a number of the plurality of two-dimensional images that are obtained is at least 150.

9. The three-dimensional display system according to claim 1, wherein the image processor is connected with the at least one projector and the first driving structure in a wired or wireless way, or
the image processor and the at least one projector are integrated and connected with the first driving structure in a wired or wireless way.

10. The three-dimensional display system according to claim 1, wherein the projection body is made of a transflective material.

11. The three-dimensional display system according to claim 1, wherein the reflection surface comprises a diffuse planar medium.

12. The three-dimensional display system according to claim 1, wherein the at least one projector is fixedly arranged on the projection body or fixedly arranged on a carrying device separated from the optical reflector.

13. The three-dimensional display system according to claim 1, wherein a bottom of the projection body having the polyhedral pyramid shape or the hemispherical shape is farther away from the optical reflector than a top of the projection body.

14. The three-dimensional display system according to claim 1, wherein the at least one projector is fixedly arranged on the reflection surface and rotates with the reflection surface simultaneously, and the projection body is formed to have a polyhedral pyramid shape or a hemispherical shape.

15. The three-dimensional display system according to claim 1, wherein a control signal is outputted to the first driving structure by the image processor at the regular interval to cause the at least projector to project one of the plurality of two-dimensional images onto the at least one reflection surface.

16. A three-dimensional display system, comprising:
a projection body having a three-dimensional shape and a transflective property;
an optical reflector comprising at least one reflection surface;
a first driving structure configured to drive one of the projection body and the optical reflector to rotate, so that the projection body and the optical reflector rotate relative to each other;
at least one projector;
an image processor configured to decompose a three-dimensional image of an object to be displayed to obtain a plurality of two-dimensional images at different cross-sections of the three-dimensional image, and to send the plurality of two-dimensional images to the at least one projector;
wherein the at least one projector is configured to project the plurality of two-dimensional images onto one of the at least one reflection surface in sequence at a regular interval, and the at least one reflection surface is configured to reflect the plurality of two-dimensional images to different positions on the projection body to form the three-dimensional image,
wherein the at least one projector comprises one projector, and when the plurality of two-dimensional images are projected onto one of the at least one reflection surface in sequence at the regular interval, the projection body rotates by an angle between 0.5 degree and 2 degrees within the interval relative to the at least one reflection surface.

17. A three-dimensional display system, comprising:
a projection body having a three-dimensional shape and a transflective property;
an optical reflector comprising at least one reflection surface;
a first driving structure configured to drive one of the projection body and the optical reflector to rotate, so that the projection body and the optical reflector rotate relative to each other;
at least one projector;
an image processor configured to decompose a three-dimensional image of an object to be displayed to obtain a plurality of two-dimensional images at different cross-sections of the three-dimensional image, and to send the plurality of two-dimensional images to the at least one projector;
wherein the at least one projector is configured to project the plurality of two-dimensional images onto one of the at least one reflection surface in sequence at a regular interval, and the at least one reflection surface is configured to reflect the plurality of two-dimensional images to different positions on the projection body to form the three-dimensional image,
wherein the at least one projector comprises two projectors arranged opposite to each other, and the two projectors are radially symmetrical to each other relative to a center of the at least one reflection surface, and
wherein the projection body rotates by an angle between 1 degree and 4 degrees with the interval when the plurality of two-dimensional images are projected to one of the at least one reflection surface in sequence at the regular interval.

* * * * *